(12) United States Patent
Goetz (10) Patent No.: US 7,104,569 B2
(45) Date of Patent: Sep. 12, 2006

(54) AIR BAG MODULE WITH PRESSURE REGULATOR

(75) Inventor: George W. Goetz, Fountain Hills, AZ (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 76 days.

(21) Appl. No.: 10/441,342

(22) Filed: May 20, 2003

(65) Prior Publication Data
US 2004/0232680 A1    Nov. 25, 2004

(51) Int. Cl.
B60R 21/26    (2006.01)
(52) U.S. Cl. .................... 280/736; 280/740
(58) Field of Classification Search ............ 280/736, 280/740, 741, 742; 102/530, 531
See application file for complete search history.

(56) References Cited

U.S. PATENT DOCUMENTS

| | | | | |
|---|---|---|---|---|
| 3,797,853 A | * | 3/1974 | Grosch et al. | 280/740 |
| 4,068,862 A | * | 1/1978 | Ishi et al. | 280/740 |
| 4,178,017 A | * | 12/1979 | Ishi et al. | 280/740 |
| RE30,327 E | * | 7/1980 | Damon | 280/740 |
| 5,489,118 A | * | 2/1996 | Carothers et al. | 280/741 |
| 5,516,147 A | * | 5/1996 | Clark et al. | 280/736 |
| 5,951,040 A | | 9/1999 | McFarland et al. | |
| 6,116,642 A | | 9/2000 | Shirk et al. | |
| 6,142,515 A | | 11/2000 | Mika | |
| 6,155,599 A | * | 12/2000 | Bowers et al. | 280/740 |
| 6,199,906 B1 | | 3/2001 | Trevillyan et al. | |
| 6,227,565 B1 | | 5/2001 | McFarland et al. | |
| 6,494,483 B1 | * | 12/2002 | Floersheimer et al. | 280/740 |
| 6,702,323 B1 | * | 3/2004 | Goetz | 280/736 |

OTHER PUBLICATIONS

Co-pending U.S. Appl. No. 09/962,780, filed Sep. 25, 2001 entitled "Air Bag Module with Pressure Regulator".

* cited by examiner

Primary Examiner—David R. Dunn
(74) Attorney, Agent, or Firm—Tarolli, Sundheim, Covell & Tummino LLP (57) ABSTRACT

An inflator (14) for an inflatable vehicle occupant protection device (12) has a housing (20). A propellant charge (240) in the housing (20) is actuatable to provide inflation fluid for inflating the device (12). The housing (20) has an end wall (42) and a side wall (44). The side wall (44) has a fluid passage (55) for directing flow of inflation fluid to the device (12). A flow control member (16) extends over the end wall (42) and the side wall (44) and has a movable portion (300) at least partially blocking the fluid passage (55). The control member (16) has an outlet opening (288) located over the end wall (42). The movable portion (300) moves as the pressure of inflation fluid acting on it increases upon inflator actuation to control the pressure in the housing (20) and to direct inflation fluid toward the outlet opening (288).

18 Claims, 4 Drawing Sheets

AIR BAG MODULE WITH PRESSURE REGULATOR

BACKGROUND OF THE INVENTION

1. Technical Field

The present invention relates to an apparatus for inflating an inflatable vehicle occupant protection device. In particular, the present invention relates to an air bag module including an inflator and a pressure regulator for controlling pressure in the inflator.

2. Description of the Prior Art

An inflatable vehicle occupant protection device, such as an air bag, is deployed upon the occurrence of a vehicle crash. The air bag is part of a vehicle occupant protection apparatus, which further includes a crash sensor and an inflator. The inflator includes a housing and an inflation fluid source, such as a solid propellant, in the housing. When the crash sensor senses a crash-indicating condition for which deployment of the air bag is desired, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

It is known to use a pressure regulator, or flow regulator, to control the pressure in the inflator and the flow of inflation fluid out of the inflator. This can be done to accommodate very low or high ambient temperatures, and to facilitate combustion of the propellant in the inflator.

SUMMARY OF THE INVENTION

The present invention relates to an apparatus comprising an inflatable vehicle occupant protection device and an inflator having a housing. The inflator includes a propellant charge in the housing actuatable to provide inflation fluid for inflating the inflatable device. The housing has an end wall and a side wall. The side wall has a fluid passage for directing flow of inflation fluid out of the housing to the inflatable device. The apparatus includes a flow control member extending over the end wall and the side wall. The flow control member has a movable portion at least partially blocking the fluid passage. The flow control member has an outlet opening located over the housing end wall. The movable portion of the flow control member moves as the pressure of inflation fluid acting on the portion of the flow control member increases upon actuation of the inflator to control the pressure in the housing and to direct inflation fluid to flow toward the outlet opening.

The present invention also relates to an apparatus comprising an inflatable vehicle occupant protection device and an inflator having a generally cylindrical configuration centered on an axis. The inflator is actuatable to provide inflation fluid for inflating the protection device. The inflator has a housing including a generally cylindrical housing side wall extending about the axis, the housing side wall having a fluid flow area for directing flow of inflation fluid out of the housing to the protection device. The housing also has a housing end wall extending radially of the axis and the housing side wall. The inflator also includes a flow control member having a control member side wall extending over the housing side wall and a control member end wall extending radially of the axis. The control member side wall has the same cross-sectional configuration through the circumference of the control member. The control member end wall defines a plurality of flow directing openings for directing fluid flow into the device. The control member side wall and the control member end wall upon actuation of the inflator direct fluid flow to the flow directing openings.

BRIEF DESCRIPTION OF THE DRAWINGS

Further features of the present invention will become apparent to those skilled in the art to which the present invention relates from reading the following description with reference to the accompanying drawings, in which.

DESCRIPTION OF THE INVENTION

Figure 1:
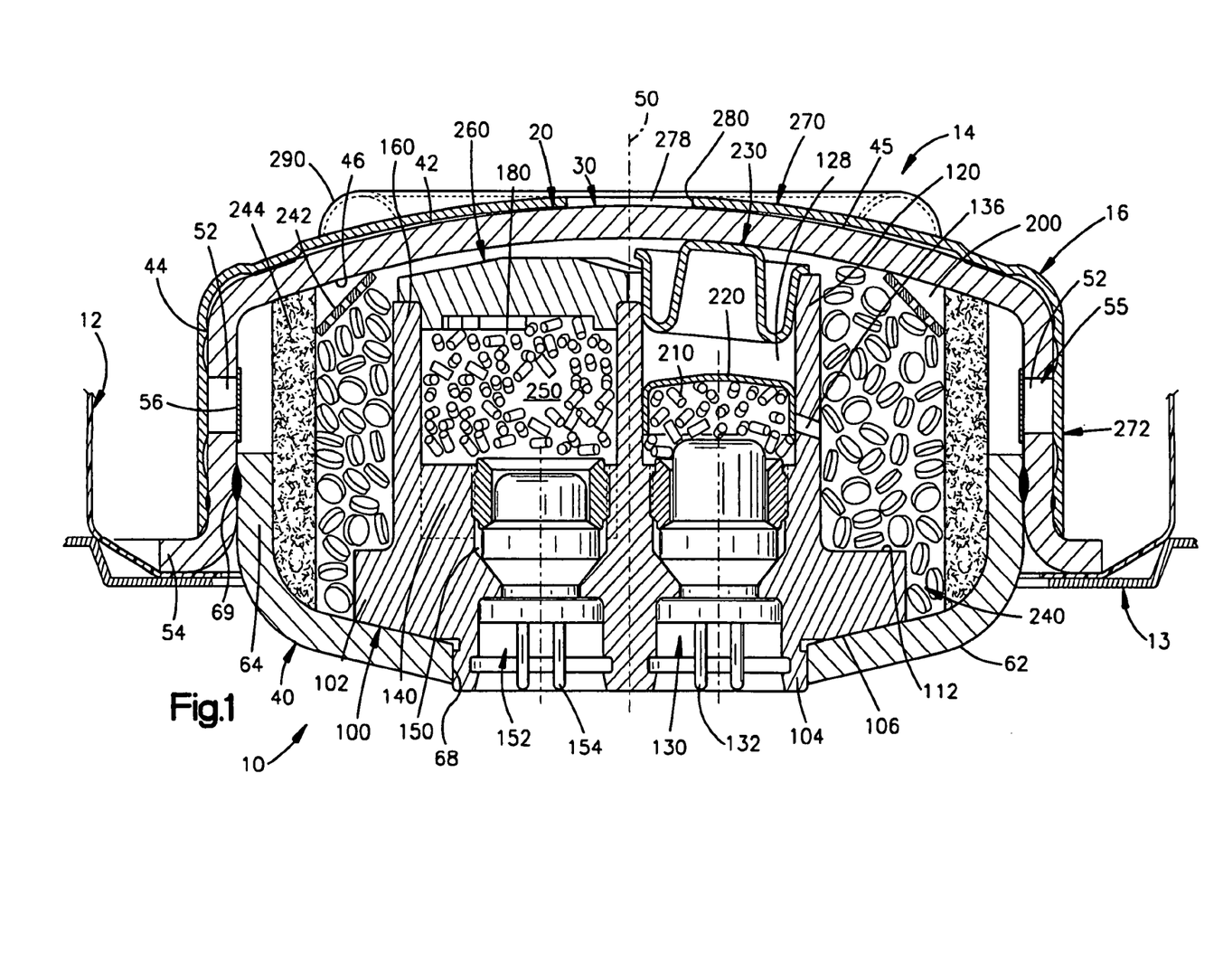
FIG. 1 is a sectional view of a vehicle occupant protection apparatus including an inflator with a pressure regulator in accordance with a first embodiment of the invention.

The present invention relates to an apparatus for inflating an inflatable vehicle occupant protection device. In particular, the present invention relates to an air bag module including an inflator and a pressure regulator for controlling pressure in the inflator. The present invention is applicable to various air bag module constructions. As representative of the present invention, FIG. 1 illustrates a vehicle occupant protection apparatus or air bag module 10 in accordance with one embodiment of the invention.

The module 10 includes an inflatable vehicle occupant protection device 12. In the preferred embodiment of the invention, the protection device 12 is an air bag for helping to protect a driver of a vehicle. Other inflatable vehicle occupant protection devices that can be used in accordance with the present invention include, for example, inflatable seat belts, inflatable knee bolsters, inflatable head liners, inflatable side curtains, and knee bolsters operated by inflatable air bags. FIG. 1 shows only a portion of the air bag 12, specifically, a mouth portion. The mouth portion is secured in the module 10 by clamping between a mounting plate 13 and a portion of an inflator 14.

The inflator 14 is electrically actuatable to provide inflation fluid for inflating the air bag 12. When the air bag 12 is inflated, it extends into a vehicle occupant compartment (not shown) to help protect a vehicle occupant from a forceful impact with parts of the vehicle, such as the vehicle steering wheel, as a result of a crash. The module 10 also includes, in addition to the inflator 14 and the air bag 12, a pressure regulator or flow control member in the form of a cap 16, described below in detail, for controlling flow of inflation fluid out of the inflator.

The inflator 14 (FIGS. 1–3) is constructed generally as shown in U.S. Pat. No. 6,142,515. Specifically, the inflator 14 includes a generally cylindrical housing or shell 20. The inflator 14 has a circular configuration as viewed from above. The housing 20 includes a first or upper (as viewed in FIG. 1) housing part 30, referred to herein as a diffuser, and a second or lower (as viewed in FIG. 1) housing part 40, referred to herein as a closure.

Figure 2:
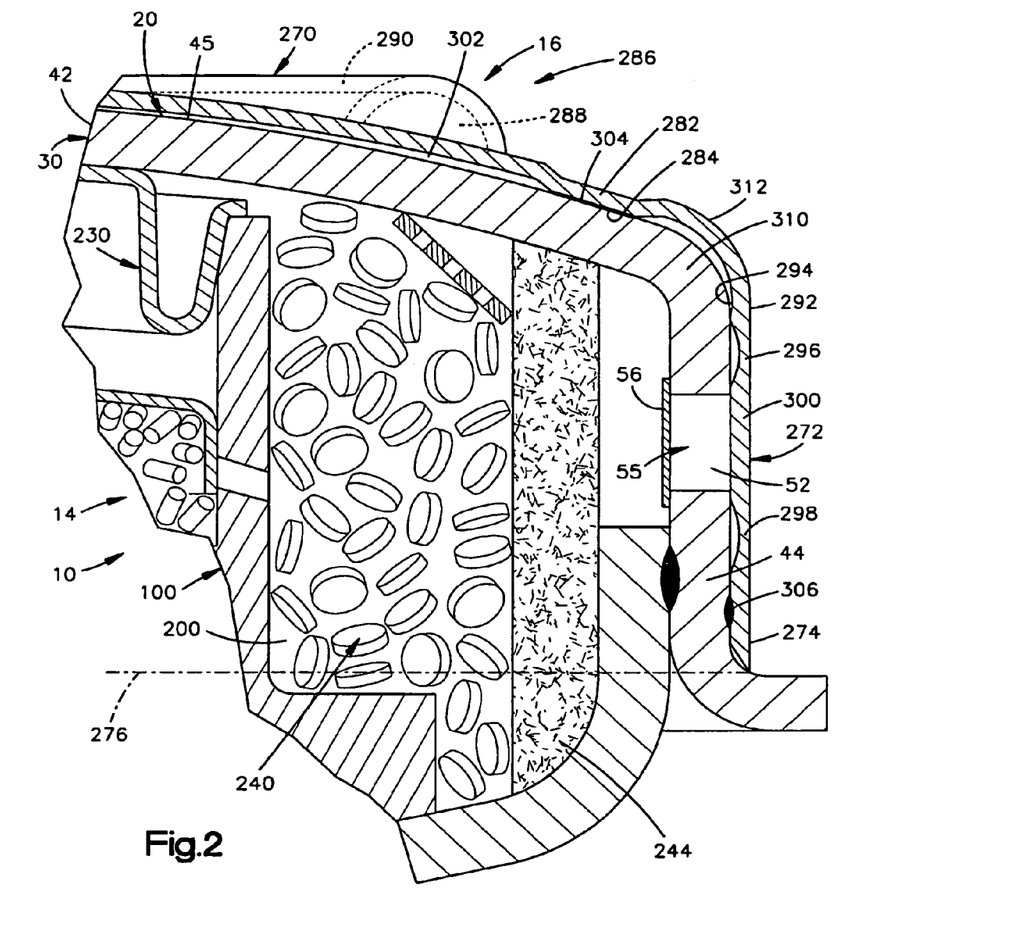
FIG. 2 is an enlarged view of a portion of FIG. 1, with the inflator shown in an unactuated condition.

The diffuser 30 has an inverted, cup-shaped configuration centered on an axis 50 of the inflator 14. The diffuser 30
} includes a radially extending end wall 42 and an axially extending side wall 44 that are joined at a circumferential corner 310 (FIG. 2). The end wall 42 of the diffuser 30 is domed, that is, has a curved configuration projecting away from the closure 40. The end wall 42 has an outer side surface 45 and an inner side surface 46.

The side wall 44 of the diffuser 30 has a cylindrical configuration centered on the axis 50. A plurality of inflation fluid outlets 52 are disposed in a circular array on the side wall 44. Each one of the inflation fluid outlets 52 extends radially through the side wall 44. An annular inflator mounting flange 54 extends radially outward from the side wall 44 at a location below (as viewed in FIG. 1) the inflation fluid outlets 52.

The outlets 52 enable flow of inflation fluid out of the inflator 10 to inflate the air bag 12. The outlets 52, as a group, form a fluid passage 55. The outlets 52 are covered, on the inside of the diffuser 30, with a rupturable tape 56 (FIG. 2), such as aluminum tape, to help seal the inflator housing 20. Because of the presence of the inflation fluid outlets 52, the inflator side wall 44 does not have the same cross-sectional configuration throughout the circumferences of the housing. Specifically, at some points, the side wall 44 is solid (impermeable) while at other points, an inflation fluid outlet 52 is present.

The closure 40 (FIG. 1) has a cup-shaped configuration including a radially extending end wall 62 and an axially extending side wall 64. The end wall 62 of the closure 40 is domed, that is, has a curved configuration projecting away from the upper housing part 30. A circular opening 68 in the end wall 62 is centered on the axis 50.

The side wall 64 of the closure 40 has a cylindrical configuration centered on the axis 50. The outer diameter of the side wall 64 of the closure 40 is approximately equal to the inner diameter of the side wall 44 of the diffuser 30. The closure 40 is nested inside the upper housing part 30, as seen in FIG. 1. The side wall 64 of the closure 40 is welded to the side wall 44 of the upper housing part 30 with a single, continuous weld 69.

The inflator 14 includes an igniter housing 100. The igniter housing 100 is located centrally in the inflator 14. The igniter housing 100 includes a mounting portion 102, a primary initiator wall 120, a secondary initiator wall 140, and a secondary propellant chamber wall 160.

The mounting portion 102 of the igniter housing 100 is disposed at the lower end of the igniter housing 100. A cylindrical end portion 104 of the mounting portion 102 extends into the circular central opening 68 in the end wall 62 of the closure 40. Above the end portion 104, the mounting portion 102 has a radially extending lower side surface 106, which is in engagement with the end wall 62 of the closure 40.

The primary initiator wall 120 of the igniter housing 100 projects axially from an upper side surface 112 of the mounting portion 102. The wall 120 has a cylindrical configuration and is not centered on the axis 50. The axis 50 extends through the wall 120.

The primary initiator wall 120 defines a primary ignition chamber 128 radially inward of the wall. A primary initiator 130 is mounted in the primary ignition chamber 128. The primary initiator 130 is a known device that is electrically actuatable by an electric current applied through terminals 132 to generate combustion products. A plurality of ports or passages 136 are formed in the primary initiator wall 120, above the primary initiator 130. The passages 136 extend between the primary ignition chamber 128 and the exterior of the igniter housing 100.

The secondary initiator wall 140 of the igniter housing 100 projects axially from the upper side surface 112 of the mounting portion 102 of the igniter housing 100. The wall 140 has a generally cylindrical configuration extending parallel to the axis 50. The wall 140 has a portion in common with the primary initiator wall 120. The secondary initiator wall 140 is not centered on the axis 50. The inflator axis 50 extends through the common wall portion.

The secondary initiator wall 140 defines a secondary ignition chamber 150 radially inward of the wall 140. A secondary initiator 152 is mounted in the secondary ignition chamber 150. The secondary initiator 152 is a known device that is electrically actuatable by an electric current applied through terminals 154 to generate combustion products.

The secondary propellant chamber wall 160 of the igniter housing 100 extends axially upward from the upper side surface 112 of the mounting portion 102 of the igniter housing. The wall 160 is spaced, throughout most of its circumference, outward from and encloses the secondary initiator wall 140. A secondary propellant chamber 180 is defined inside the secondary propellant chamber wall 160. A ring-shaped primary propellant chamber or combustion chamber 200 is defined inside the side wall 44 of the diffuser 30 and outside the igniter housing 100.

A primary ignition material 210 is located in the primary ignition chamber 128, adjacent to and in contact with the primary initiator 130. The primary ignition material 210 is a known material that is ignitable by the primary initiator 130 and that, when ignited, generates combustion products. A known autoignition material is mixed in with the primary ignition material 210.

A cup-shaped metal igniter cap 220 is disposed in the primary ignition chamber 128 in the igniter housing 100. The igniter cap 220 contains the primary ignition material 210 in the primary ignition chamber 128. The igniter cap 220 is press fit inside the primary initiator side wall 120 of the igniter housing 100.

A metal spring cap 230 closes the upper end of the primary ignition chamber 128 in the igniter housing 100. The spring cap 230 is spaced apart axially from the igniter cap 220, with open space between them. The spring cap 230 is press fit inside the primary initiator side wall 120.

The inflator 14 includes a first actuatable inflation fluid source 240 in the form of a solid propellant. The propellant 240 is located in the primary combustion chamber 200, surrounding the igniter housing 100. The propellant 240 is a known material that is ignitable by the combustion products of the primary ignition material 210 and that, when ignited, produces inflation fluid in the form of gas under pressure for inflating the air bag 12. The propellant 240 is illustrated as being provided in the form of a plurality of tablets filling or substantially filling the primary propellant chamber 200. The propellant 240 could, alternatively, be provided in the form of small pellets or discs. A perforated metal propellant retainer 242 and a filter 244 help prevent movement and rattling of the propellant 240.

The inflator 14 includes a second actuatable inflation fluid source 250 in the form of a solid propellant. The secondary propellant 250 is located in the secondary propellant chamber 180. The secondary propellant 250 is a known material that is ignitable by the secondary initiator 152 and that, when ignited, produces inflation fluid in the form of gas under pressure for inflating the air bag 12. The secondary propellant 250 may be made from the same material as the primary propellant 240. The secondary propellant 250 is illustrated as being provided in the form of a plurality of small pellets filling or substantially filling the secondary propellant chamber 180. The secondary propellant 250 could, alternatively, be provided in the form of discs or tablets.

A secondary cap 260 closes the upper end of the secondary propellant chamber 180 in the igniter housing 100. The secondary cap 260 contains the secondary propellant 250 in the secondary propellant chamber 180.

The igniter housing 100 is trapped or captured axially between the diffuser 30 and the closure 40. Specifically, the distance between the diffuser 30 and the mounting portion 102 of the igniter housing 100 is selected so that, when the housing parts 30 and 40 are welded together with the igniter housing inside, the spring cap 230 resiliently engages the end wall 42 of the diffuser 30. The mounting portion 102 of the igniter housing 100 is pressed axially into engagement with the closure 40.

The cap (or pressure regulator) 16 (FIGS. 1–5) is a one-piece metal member formed by drawing or stamping or a similar operation. A cap 16 in accordance with the present invention could be made from a material other than metal, could be made from more than one piece, and could be made in a different manner or have a different configuration than that shown.

The cap 16 has an inverted, cup-shaped configuration similar to that of the diffuser 30. The cap 16 includes a radially extending end wall 270 and an axially extending side wall 272 that are joined at a circumferential corner 312 (FIG. 2). The end wall 270 and the side wall 272 are both centered on the axis 50. The side wall 272 of the cap terminates in an end portion 274 (FIG. 2), the lower edge of which defines an imaginary base plane 276 of the cap 16. The base plane 276 extends perpendicular to the axis 50.

The end wall 270 of the cap 16 is domed, that is, has a curved configuration projecting at its center away from the base plane 276. Preferably, the end wall 270 of the cap 16 has a radius of curvature that is slightly less than the radius of curvature of the end wall 42 of the diffuser 30. The end wall 270 has a central opening 278, which in the illustrated embodiment is circular and is centered on the axis 50. The opening 278 is defined by an inner peripheral edge portion 280 of the end wall 270. The end wall 270 has a substantially uniform thickness.

The curved configuration of the end wall 270 of the cap 16 is discontinuous near its radially outer periphery, that is, near the side wall 272 of the cap. Specifically, the end wall 270 of the cap 16 has an annular flattened area, or rib, 282 that is located near the side wall 272. The rib 282 comprises material of the end wall 270 that is displaced toward the base plane 276 and the interior of the cap 16. The rib 282 has a planar, annular inner side surface 284 that is presented toward the outer side surface 45 of the end wall 42 of the diffuser 30. The inner side surface 284 of the rib 282 is closer to the base plane 276 of the cap 16 than are the portions of the cap end wall 270 immediately on either side of the rib.

The end wall 270 of the cap 16 has an outlet opening 286 for discharging inflation fluid from the inflator 14. In the illustrated embodiment, the outlet opening 286 comprises a plurality of fan-shaped openings 288 for discharging inflation fluid from the inflator 14. The openings 288 are at the radially outer ends of projecting portions, or louvers, 290 that project upward from the nominal domed curvature of the end wall 270. All the louvers 290 are identical to each other and are equally spaced around the axis 50. In the illustrated embodiment, the cap 16 has six louvers 290, and therefore six openings 288. The size of the openings 288 is selected to provide the desired amount of fluid flow area for directing inflation fluid out of the inflator 14 into the air bag 12.

Because of the presence of the louvers 290, the cap end wall 270 does not have the same cross-sectional configuration at all locations circumferentially around the extent of the cap. More particularly, at some locations, the end wall is solid and impermeable, while at other locations, a louver 290 is present.

The side wall 272 of the cap 16 has a generally cylindrical configuration centered on the axis 50. The outer side surface 292 of the side wall 272 is cylindrical and is centered on the axis 50. The inner side surface 294 of the side wall 272 is contoured to provide the side wall with a thickness that varies along its length between the end wall 270 and the base plane 276. Thus, the side wall 272 has two relatively thin portions 296 and 298 spaced axially about a relatively thick blocking portion 300. The end portion 274 of the side wall 272 is located below the lower (as viewed in FIGS. 1–3) thin portion 298 of the side wall. The side wall 272 of the cap 16 has the same cross-sectional configuration at all locations throughout the circumference of the cap.

When the cap 16 is fitted on the diffuser 30, the end wall 270 of the cap overlies the end wall 42 of the diffuser. The inner side surface 284 of the rib 282 is adjacent the outer side surface 45 of the end wall 42 of the diffuser 30. The inner peripheral edge portion 280 of the end wall 270 is in abutting engagement with the outer side surface 45 of the end wall 42 of the diffuser 30. The remainder of the end wall 270 of the cap 16 is spaced apart from the end wall 42 of the diffuser 30, to form a fluid flow area 302 between the cap and the diffuser. The louvers 290 are located axially outward of the end wall 42 of the diffuser 30. The openings 288 of the louvers 290 face radially outward.

The end wall 270 of the cap 16 is sealed to the end wall 42 of the diffuser 30 at the location of the rib 282. An anaerobic sealant 304 is provided between the inner side surface 284 of the rib 282 and the outer side surface 45 of the end wall 42 of the diffuser 30. The sealant 304 blocks fluid flow across the area of engagement between the rib 282 and the diffuser 30.

When the cap 16 is fitted on the diffuser 30, the side wall 272 of the cap overlies the side wall 44 of the diffuser. The blocking portion 300 of the side wall 272 of the cap 16 overlies and closes the inflation fluid outlets 52 in the diffuser side wall 44.

The end portion 274 of the side wall 272 of the cap 16 is welded to the diffuser 30 with a seam weld 306. Together with the adhesive sealing of the rib 282 to the diffuser end wall 42, the weld 306 provides a hermetic seal for the propellant charge 240 in the housing 20.

The cap 16 is made from a material that is bendable. In particular, the cap 16 is made from a material that allows the cap to deform when the inflator 14 is actuated, enabling fluid flow out of the louvers 290. In addition, the material from which the cap 16 is formed is preferably resilient, so that the inflation fluid outlets 52 can be reclosed at least partially during inflator actuation, to maintain pressure in the inflator 14. One suitable material is stainless steel with a thickness of about one millimeter.

Specifically, the cap 16 is bendable so that the blocking portion 300 of the side wall 272 is movable relative to the welded end portion 274. The blocking portion 300 is movable away from the diffuser side wall 44, in a direction away from the axis 50. When such movement occurs, the inflation fluid outlets 52 are at least partially uncovered.

When the blocking portion 300 of the side wall 272 is spaced apart from the inflation fluid outlets 52 by a relatively large distance, the cap 16 does not significantly restrict fluid flow through the outlets. When the blocking portion 300 of the side wall 272 is relatively close to the inflation fluid outlets 52, the cap 16 at least partially restricts or blocks fluid flow through the outlets. Prior to actuation of the inflator 14, the blocking portion 300 of the side wall 272 at least partially blocks fluid flow through the inflation fluid openings 52. In a preferred embodiment, the side wall 272 is resilient, that is, is elastically deformable rather than merely plastically deformable, and can move both away from and back toward or into engagement with the side wall 44 of the diffuser 30.

In addition, the end wall 270 of the cap 16 is bendable and is movable away from the inflator housing 20, in a direction away from the end wall 42 of the diffuser 30 and away from the base plane 276. When such movement occurs, the sealant 304 between the rib 282 and the housing 20 can be broken to enable fluid to flow from the inflation fluid outlets 52 along the outer side surface 45 of the end wall 42 of the diffuser 30. In a preferred embodiment, the cap end wall 270 is resilient, that is, is elastically deformable rather than merely plastically deformable, and can move both away from and back toward the end wall 42 of the diffuser 30.

In the event of a vehicle crash at or above a first predetermined threshold level of crash severity, but below a second predetermined threshold level of crash severity, an electric signal is applied to only the terminals 132 of the primary initiator 130 of the inflator 14. The primary initiator 130 is actuated and ignites the primary ignition material 210. The combustion products of the primary ignition material 210 flow through the passages 136 into the primary combustion chamber 200.

The combustion products flowing into the primary propellant chamber 200 ignite the primary propellant 240. The primary propellant 240 combusts and produces inflation fluid under pressure in the primary propellant chamber 200. The pressure in the primary propellant chamber 200 rises rapidly to a pressure in the range of about 1,000 psi to about 2,000 psi or more.

The secondary cap 260 during this time blocks flow of combustion products from the primary propellant chamber 200 (which surrounds the secondary cap) into the secondary propellant chamber 180. This prevents ignition of the secondary propellant 250 when the primary initiator 130 is actuated but the secondary initiator 152 is not actuated.

The pressure of the inflation fluid ruptures the tape 56, and inflation fluid flows out of the primary propellant chamber 200 through the inflation fluid outlets 52. The inflation fluid strikes the blocking portion 300 of the side wall 272 of the cap 16, and exerts force against it in a radially outward direction. The force exerted by the inflation fluid causes the side wall 272 of the cap 16 to bend outward by a small amount, away from the side wall 44 of the diffuser 30 and away from the inflation fluid outlets 52.

Figure 3:
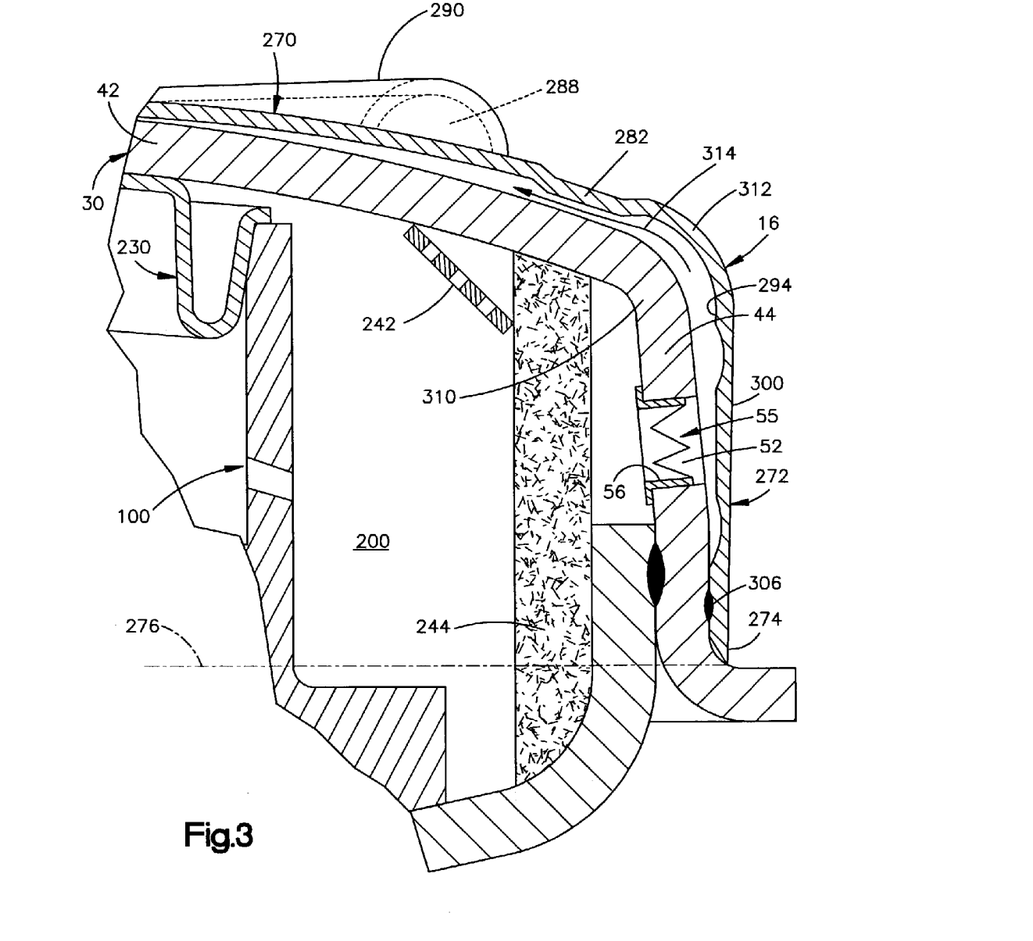
FIG. 3 is a view similar to FIG. 2, showing the inflator in an actuated condition.
Figure 4:
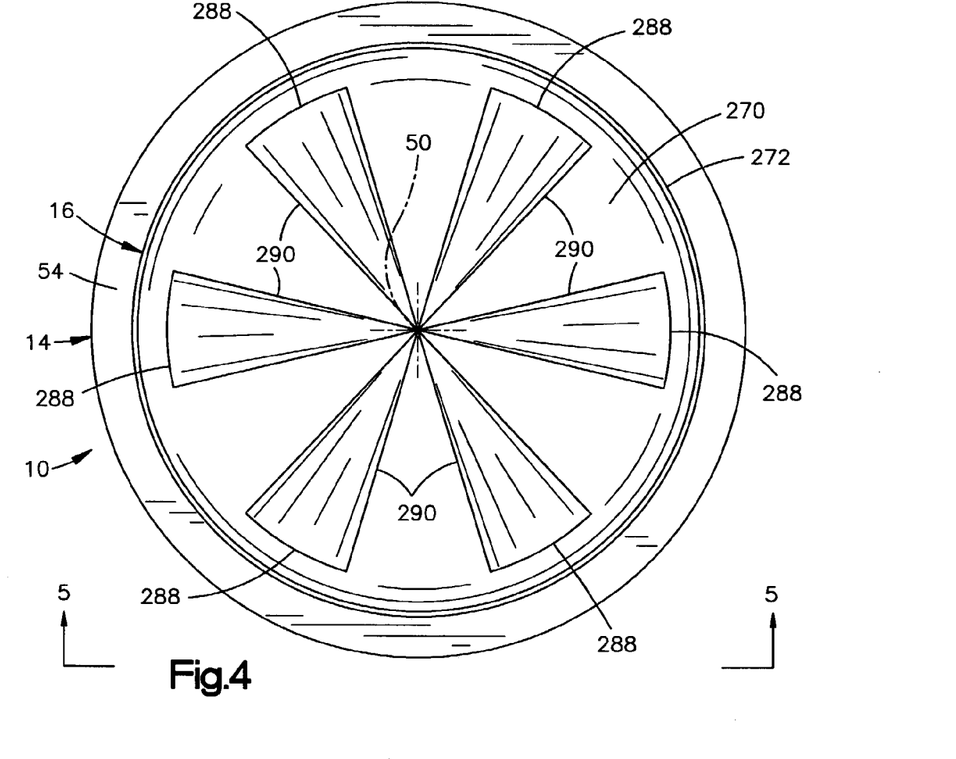
FIG. 4 is a top plan view of the inflator and pressure regulator of FIG. 1.
Figure 5:
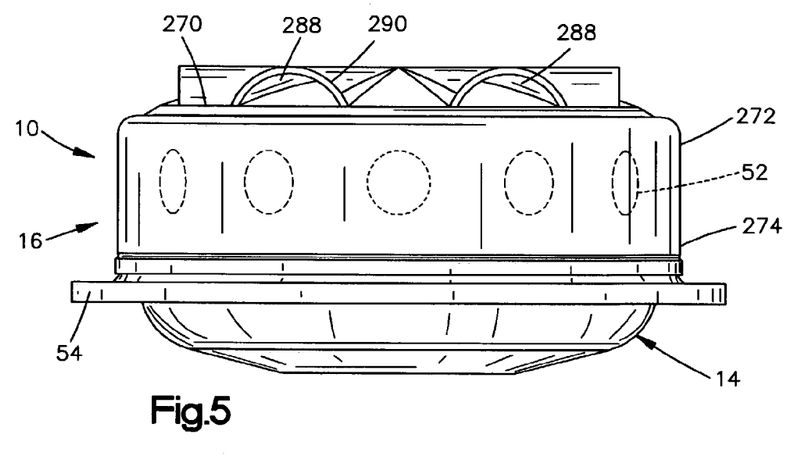
FIG. 5 is an elevational view of the inflator and pressure regulator of FIG. 1.

At the same time, the pressure of the inflation fluid in the combustion chamber is directed against the end wall 42 of the diffuser 30, in an upward direction as viewed in FIGS. 1–3. The end wall 42 of the diffuser 30 bows outward (upward as viewed in FIGS. 1–3), assuming a smaller radius of curvature. This upward movement of the end wall 42 of the diffuser 30 pulls the side wall 44 of the diffuser radially inward, causing it to assume a conical shape rather than its original cylindrical shape, as can be seen in FIG. 3. As the side wall 44 of the diffuser 30 deforms, it moves radially inward away from the side wall 272 of the cap 16, and the corner 310 of the diffuser 30 is pulled inward away from the corner 312 of the cap 16.

The inward movement of the diffuser side wall 44, combined with the small amount of outward movement of the side wall 272 of the cap 16, increases the distance between the inflation fluid outlets 52 and the side wall of the cap. As a result, the effective flow area of the diffuser 30 increases.

The force of the moving end wall 270 of the cap 16 causes the sealant 304 to break, allowing the rib 282 to move away from the diffuser end wall 42. When the rib 282 moves away from the diffuser end wall 42, a fluid flow path 314 is established between the inflation fluid outlets 52 in the housing 20 and the fluid openings 288 in the cap 16. The fluid flow path 314 extends from the inflation fluid outlets 52, between the outer side surface of the side wall 44 of the diffuser 30 and the inner side surface 294 of the side wall 272 of the cap 16. The fluid flow path 314 extends past the corner 312 of the cap 16 and between the end wall 270 of the cap and the end wall 42 of the diffuser 30, along the outer side surface 45 of the end wall of the diffuser. The fluid flow path 314 extends through the louvers 290 to the outlet openings 288 in the louvers. As a result, inflation fluid from the combustion chamber 200 can flow out of the inflator 14 through the inflation fluid outlets 52 and through the outlet openings 288 in the cap 16.

The flow area of the fluid flow path 314 downstream of the outlets 52 in the housing 20 varies in accordance with the pressure of inflation fluid in the housing 20 and, thereby, with the force exerted on the side wall 272 of the cap 16. The higher the pressure in the housing 20, the greater the force exerted by the inflation fluid on the diffuser 30 and the cap 16, and the more the space between the side wall 44 of the diffuser and the side wall 272 of the cap enlarges. The more this space enlarges, the greater the flow area of the fluid flow path 314. Thus, the variable positioning of the side wall 272 of the cap 16 relative to the side wall 44 of the diffuser 30 acts as a control for the rate of fluid flow out of the inflator 14.

The cap 16 thus also acts as a regulator for the pressure of the inflation fluid in the inflator housing 20. As the flow area of the fluid flow path 314 increases, the pressure inside the housing 20 can decrease. Because the flow area of the fluid flow path 314 varies in accordance with the pressure of inflation fluid in the housing 20, the internal operating pressure of the inflator 14 is self-regulating.

The inflation fluid that flows from the outlet openings 288 of the cap 16 is flowing substantially radially, with little or no axial component of force. As a result, the inflator 14 is thrust neutral, that is, does not exhibit any significant axial thrust upon actuation. This can provide a significant safety advantage when the inflator 14 is being transported prior to assembly in a vehicle. In addition, the inflation fluid flows out of all the outlet openings 288 simultaneously, so that the flow is generally symmetric around the axis 50.

Also, because the cap side wall 272 has the same cross-sectional configuration at all locations circumferentially around the axis 50, there is no requirement for circumferential alignment of the cap 16 with the inflator housing 20, during assembly, even though the inflator side wall does not have the same cross-sectional configuration through its circumference. Regardless of the orientation around the axis 50 of the cap 16 on the inflator housing 20, the cap still covers the inflation fluid openings 52 in the same manner. Therefore, the cap 16 can be assembled to the inflator housing 20 in any orientation around the axis 50.

In this regard, it is not necessary that all portions of the cap side wall 272 be exactly the same at each radial cross-section. Rather, the cap 26 must function the same no matter what orientation it has about the axis 50 relative to the inflator housing. By way of contrast, consider a cap that includes a plurality of spaced apart, discrete tabs or fingers, which fit into the inflation fluid outlets 52 in the inflator housing at one particular orientation of the cap about the axis 50. Such a cap would not function the same if the cap were rotated about the axis so that its fingers engaged the housing side wall at locations between the inflation fluid outlets. Thus, what is important in this regard is that the movable portion of the cap side wall 272 function the same in each circumferential orientation of the cap 16 about the axis 50, minor structural differences notwithstanding.

In addition, because the cap side wall 272 has the same cross-sectional configuration at all locations throughout the circumference of the cap, the cap 16 can be assembled in any orientation relative to the mounting plate 13. This is important because some vehicle manufacturers require that the inflator 14 be assembled to the mounting plate 13 in one particular circumferential orientation only (within about fifteen degrees), to enable proper electrical connection of vehicle electric circuitry with the initiators 130 and 152. If the inflator 14 and the cap 16 and the mounting plate 13 were usable together only in one relative orientation of all three components, more careful assembly of each module 10 would be required. Instead, the rotational symmetry of the side wall 272 of the cap 16 allows the inflator 14 to be assembled to the mounting plate 13 in the desired orientation, regardless of the orientation of the cap.

In the event of a vehicle crash at or above the second predetermined threshold level of crash severity, both the primary initiator 130 and the secondary initiator 152 of the inflator 14 are actuated. The actuation of the primary initiator 130 results in ignition of the primary propellant 240 as described above. Inflation fluid produced by the primary propellant 240 flows out of the inflator 14 as described above.

The secondary initiator 152 is actuated by an electric signal applied to the terminals 154 of the secondary initiator. The secondary initiator 152 ignites the secondary propellant 250. The secondary propellant 250 produces combustion products, which increase the pressure in the secondary combustion chamber 180. This increased pressure acts on the secondary igniter cap 260 and causes the secondary igniter cap to move upward as viewed in FIG. 1, out of engagement with the igniter housing 100.

The combustion products of the secondary propellant 250 flow out of the secondary combustion chamber 180 and join with the combustion products of the primary propellant 240 in the primary combustion chamber 200. The resulting increase of pressure in the primary combustion chamber 200 causes the end wall 42 and the side wall 44 of the diffuser 30 to bend or deform more than they do when only the primary propellant 240 is ignited. This increased bending or deformation of the diffuser increases the flow area of the passage 55.

As noted above, the diffuser 30 and the cap 16 may be constructed so that their movement is at least partially elastic. That is, upon a decrease in the pressure at the inflation fluid outlets 52, the side wall 44 of the diffuser 30 and the side wall 272 of the cap 16 could move toward each other, reclosing at least partially the inflation fluid outlets 52. In this case, the pressure in the inflator housing 20 can be maintained even if the fluid output from the burning propellant decreases over time.

As such, the present invention may be particularly useful in a dual stage inflator, like the inflator 10. In the event of a significant delay between actuation of the first and second stages, elasticity of the diffuser 30 and the cap 16 can help to maintain the pressure in the inflator housing 20 prior to combustion of the second stage. Additionally, the cap 16 can help to maintain a desired constant pressure in the inflator housing 20 during the different circumstances of actuation of either one or both stages of the inflator 14.

The diffuser 30 and the cap 16 may, alternatively, be constructed so that their movement is plastic, if it is expected that the fluid output from the burning propellant in the housing 20 will increase continuously.

From the above description of the invention, those skilled in the art will perceive improvements, changes and modifications in the invention. Such improvements, changes and modifications within the skill of the art are intended to be covered by the appended claims.

I claim:

1. An apparatus comprising:
   an inflatable vehicle occupant protection device;
   an inflator having a housing, said inflator including a propellant charge in said housing actuatable to provide inflation fluid for inflating said inflatable device;
   said housing having an end wall and having a side wall, said side wall having a fluid passage for directing flow of inflation fluid out of said housing to said inflatable device; and
   a flow control member extending over said end wall and said side wall, said flow control member having a movable portion at least partially blocking said fluid passage, said flow control member having an outlet opening located over said housing end wall;
   said movable portion of said flow control member moving as the pressure of inflation fluid acting on said portion of said flow control member increases upon actuation of said inflator to control the pressure in said housing and to direct inflation fluid to flow toward said outlet opening.

2. An apparatus as set forth in claim 1 wherein said flow control member is spaced apart from said housing upon actuation of said inflator to form a fluid flow path between said fluid passage of said housing and said outlet opening of said flow control member, said fluid flow path extending along an exterior surface of said housing side wall and along an exterior surface of said housing end wall.

3. An apparatus as set forth in claim 1 wherein said flow control member is sealed to said housing at an annular seal location disposed between said fluid passage of said housing and said outlet opening of said flow control member, when said inflator is not actuated.

4. An apparatus as set forth in claim 3 wherein said flow control member is welded to said housing side wall at an annular weld location on the opposite side of said fluid passage of said housing from said annular seal location, said annular weld and said annular seal providing a hermetic seal for said propellant charge.

5. An apparatus as set forth in claim 1 wherein a side wall of said flow control member including said movable portion has the same cross-sectional configuration throughout the circumference of said control member, and said fluid passage provides said housing side wall with a cross-sectional configuration that varies around the circumference of said housing.

6. An apparatus as set forth in claim 2 wherein the flow area of said fluid flow path varies in accordance with the pressure of the inflation fluid acting on said movable portion of said flow control member.

7. An apparatus as set forth in claim 1 wherein said movement of said of said movable portion of said flow control member results in plastic deformation of said flow control member.

8. An apparatus as set forth in claim 1 wherein said movement of said movable portion of said flow control member results in elastic deformation of said flow control member.

9. An apparatus as set forth in claim 1 wherein said inflator comprises first and second independently actuatable inflation fluid sources, said movable portion of said flow control member being movable in different amounts upon actuation of one or both of said first and second inflation fluid sources due to the pressure of inflation fluid acting on said portion of said flow control member.

10. An apparatus comprising:
an inflatable vehicle occupant protection device; and
an inflator having a generally cylindrical configuration centered on an axis, said inflator being actuatable to provide inflation fluid for inflating said protection device;
said inflator having a housing including a generally cylindrical housing side wall extending about said axis, said housing side wall having a fluid passage for directing flow of inflation fluid out of said housing to said protection device, said housing also having a housing end wall extending radially of said axis and said housing side wall;
said inflator also including a flow control member having a control member side wall overlying and facing said housing side wall and a control member end wall extending radially of said axis and overlying and facing said housing end wall, said control member side wall having the same cross-sectional configuration throughout the circumference of said control member, said flow control member being mounted on said housing and at least partially blocking said fluid passage in said housing side wall prior to actuation of said inflator;
said control member end wall defining a plurality of flow directing openings for directing fluid flow into said device, said control member side wall and said control member end wall upon actuation of said inflator deforming to form a fluid flow path between said fluid passage of said housing side wall and said flow directing openings.

11. An apparatus as set forth in claim 10 wherein said flow control member end wall does not have the same cross-sectional configuration throughout the extent of said control member.

12. An apparatus as set forth in claim 11 wherein said control member end wall is spaced apart from said housing end wall upon actuation of said inflator to form said fluid flow path between said fluid passage of said housing side wall and said flow directing openings, said fluid flow path extending along an exterior surface of said housing side wall and along an exterior surface of said housing end wall.

13. The apparatus of claim 10 wherein said control member side wall is welded to said housing side wall.

14. The apparatus of claim 10 wherein said control member is configured such that said flow control member can be assembled to said housing at any rotational position of said flow control member around said axis.

15. An apparatus comprising:
an inflatable vehicle occupant protection device; and
an inflator having a generally cylindrical configuration centered on an axis, said inflator being actuatable to provide inflation fluid for inflating said protection device;
said inflator having a housing including a generally cylindrical housing side wall extending about said axis, said housing side wall having a fluid passage for directing flow of inflation fluid out of said housing to said protection device, said housing also having a housing end wall extending radially of said axis and said housing side wall;
said inflator also including a flow control member having a control member side wall overlying and facing said housing side wall and a control member end wall extending radially of said axis and overlying and facing said housing end wall, said control member side wall having the same cross-sectional configuration throughout the circumference of said control member, said flow control member being mounted on said housing;
said control member end wall defining a plurality of flow directing openings for directing fluid flow into said device, said control member side wall and said control member end wall upon actuation of said inflator deforming to form a fluid flow path between said fluid passage of said housing side wall and said flow directing openings, wherein said control member end wall includes a plurality of axially projecting portions spaced apart equally circumferentially in an array around said axis, each one of said projecting portions defining a respective one of said plurality of flow directing openings.

16. An apparatus comprising:
an inflatable vehicle occupant protection device; and an inflator having a generally cylindrical configuration centered on an axis, said inflator being actuatable to provide inflation fluid for inflating said protection device;
said inflator having a housing including a generally cylindrical housing side wall extending about said axis, said housing side wall having a fluid passage for directing flow of inflation fluid out of said housing to said protection device, said fluid passage providing said housing side wall with a cross-sectional configuration that varies around the circumference of said housing, said housing also having a housing end wall extending generally radially in a direction between said axis and said housing side wall;
said inflator also including a flow control member having a control member side wall extending over said housing side wall and at least partially blocking said fluid passage when said inflator is unactuated, said control member side wall having the same cross-sectional configuration throughout the circumference of said control member;
said control member side wall moving away from said fluid passage due to the pressure of inflation fluid acting on said control member side wall upon actuation of said inflator to increase fluid flow through said fluid passage.

17. An apparatus as set forth in claim 16 wherein said flow control member has a control member end wall that does not have the same cross-sectional configuration throughout the extent of said control member and that at least partially overlies said end wall of said housing.

18. An apparatus as set forth in claim 17 wherein said flow control member end wall has a flow directing surface that is spaced apart from said housing end wall upon actuation of said inflator to form a fluid flow path between said fluid passage of said housing and said flow directing surface, said fluid flow path extending along an exterior surface of said housing side wall and along an exterior surface of said housing end wall.

* * * * *